United States Patent [19]

Takagi et al.

[11] 4,305,114
[45] Dec. 8, 1981

[54] MOTOR CONTROL CENTER

[75] Inventors: Masatomo Takagi, Hachioji; Seietsu Takamatsu, Hamura; Tsuguo Noritake, Kokubunji; Mitsuo Ogaki; Norio Tetsuka, both of Fuchu; Toshio Takahashi, Higashimurayama, all of Japan

[73] Assignee: Tokyo Shibaura Denki Kabushiki Kaisha, Kawasaki, Japan

[21] Appl. No.: 158,207

[22] Filed: Jun. 10, 1980

[30] Foreign Application Priority Data

Jun. 19, 1979 [JP] Japan .................................. 54-76275
Jun. 19, 1979 [JP] Japan .................................. 54-76276
Jun. 19, 1979 [JP] Japan .................................. 54-76277

[51] Int. Cl.³ .............................................. H02B 1/04
[52] U.S. Cl. ................................... 361/342; 361/334; 361/339; 361/391
[58] Field of Search ............... 361/331, 332, 334, 335, 361/338, 339, 341, 342, 356, 358, 357, 359, 360, 361, 363, 390, 391

[56] References Cited

U.S. PATENT DOCUMENTS

| | | | |
|---|---|---|---|
| 3,142,003 | 7/1964 | Olashaw | 361/358 |
| 3,717,805 | 2/1973 | Graedinger | 361/338 |
| 4,002,955 | 1/1977 | Eggert | 361/391 |
| 4,133,994 | 1/1979 | Rozier | 361/338 |

*Primary Examiner*—Gerald P. Tolin
*Attorney, Agent, or Firm*—Oblon, Fisher, Spivak, McClelland & Maier

[57] ABSTRACT

In a motor control center of the present invention, a plurality of units are mounted on a frame. Each of these units has an appliance mounting plate with two walls which extend transversely from the floor plate in stepped form. A first group of electrical appliances which requires relatively frequent maintenance and inspection among the electrical appliances to be mounted in the unit is mounted at the front sides of said two walls and a second group of electrical appliances which requires less frequent maintenance and inspection is mounted on the back side of the wall nearest the front.

13 Claims, 14 Drawing Figures

F I G. 4
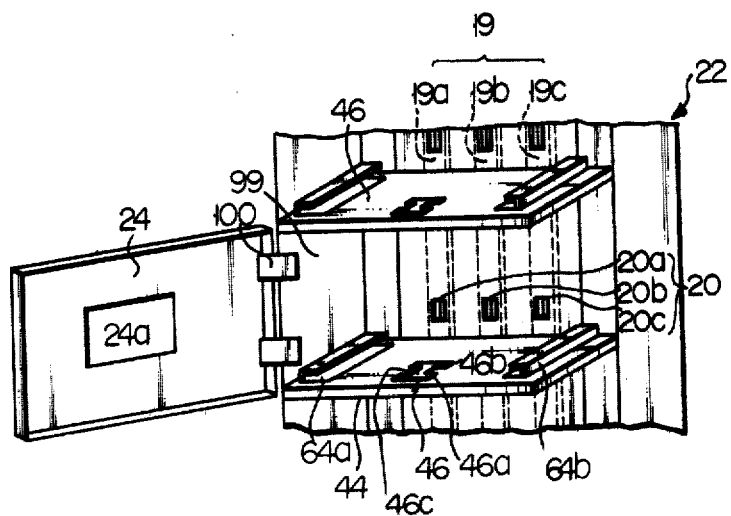

MOTOR CONTROL CENTER

BACKGROUND OF THE INVENTION

The present invention relates to a motor control center having a frame which has a plurality of mounting sections open in one direction, a three-phase main bus, a three-phase branch bus and a plurality of units each mounted in the mounting section, supplied with power from said branch bus and supplying power to a predetermined load, each of said units comprising a floor plate, a first group of electrical appliances which requires relatively frequent inspection and maintenance, and a second group of electrical appliances which requires relatively infrequent inspection and maintenance.

A motor control center of the type described is already known in which a detachably mounted unit generally has a floor plate, an appliance mounting plate and a disconnecting part mounting plate. On said floor plate is mounted a unit drawing mechanism. On said appliance mounting plate are mounted main circuit appliances such as a main circuit disconnecting part, an electric meter, an electromagnetic contactor and a thermal relay; as well as circuit control appliances such as an auxiliary relay, an auxiliary transformer, control fuses and an indicating lamp. On said disconnecting part mounting plate are mounted a main output circuit disconnecting part, a disconnecting part for control circuit, an indicating lamp. In a conventional motor control center of this type, the various electrical appliances of each unit, such as the disconnecting parts, case circuit breakers, electromagnetic contactors, transformers, etc., are arranged on the floor plate with little thought for ease of maintenance and inspection. Further, when press button switch, indicating lamp, electric meter and release button (to be referred to collectively as third group of electric appliances hereinafter) are included in each unit, such third group are customarily arranged on the unit door which is mounted on the frame and covers the front surface of the unit and which is able to open and close, or on the wiring trough door mounted separately from each unit of the motor control center, or on both doors. This type of conventional motor control center is effective for supervision and control of many electric load circuits. Nevertheless, it presents the disadvantages described below which leave room for improvement. First, maintenance and inspection is inconvenient since various electrical appliances as mentioned above are arranged with little consideration for ease in maintenance and inspection. Second, since the third group of electrical appliances are scattered on the unit door and the wiring trough door described above, the design of these doors must be altered when a part of the circuit is changed.

SUMMARY OF THE INVENTION

The primary object of the present invention is to provide a motor control center which is produced compact in size and adapted to overcome the defects of prior art motor control centers, and is easy to be maintained and inspected.

To achieve this object, the present invention provides a motor control center wherein each of the internally mounted units has an appliance mounting plate which stands upright from said floor plate and which has a first and a second vertical walls spaced apart in said one direction and extending parallel to each other in stepped form, said first group of electrical appliances is mounted on the sides of said first and second vertical walls facing said one direction, and said second group of electrical appliances is mounted on the side of said second vertical wall facing opposite to said one direction.

With the motor control center of this construction of the present invention, the first group of electrical appliances which requires relatively frequent maintenance and inspection is arranged on the front side of the appliance mounting plate, and the second group of electrical appliances which requires less frequent maintenance and inspection is arranged on the rear side of the appliance mounting plate so that maintenance and inspection of the control center is extremely easy.

In a motor control center in accordance with one preferred embodiment of the present invention a collective display panel for each unit is provided, on which are mounted appliances related to the unit such as indicating lamps, electric meters, switches, push buttons, etc. (to be referred to hereinafter as third group of electrical appliances for brevity), so that said first, second and third groups of electrical appliances related to the function of each unit are collected to facilitate control, maintenance and inspection of the load circuit, and to simplify the design and electrical wiring of the motor control center.

In a motor control center in accordance with another preferred embodiment of the present invention, said collective display panel is pivotably mounted to the unit so that inspection of the inside of the unit is easy by simply pivoting the display panel.

In a motor control center in accordance with still another preferred embodiment of the present invention, a locking mechanism is provided for locking the unit in a position at which an accurate coupling with the branch bus mounted on the frame is easily facilitated by inserting the unit in a corresponding mounting section and for drawing the unit to a predetermined position to prosecute an inspection and/or a simple test of the interior of the unit.

These preferred embodiments will be described in more detail in the description of the preferred embodiments.

BRIEF DESCRIPTION OF THE DRAWINGS

FIG. 4 is a perspective view illustrating the construction of the mounting section of the unit shown in FIG. 2;

DETAILED DESCRIPTION OF THE PREFERRED EMBODIMENTS

Figure 1:
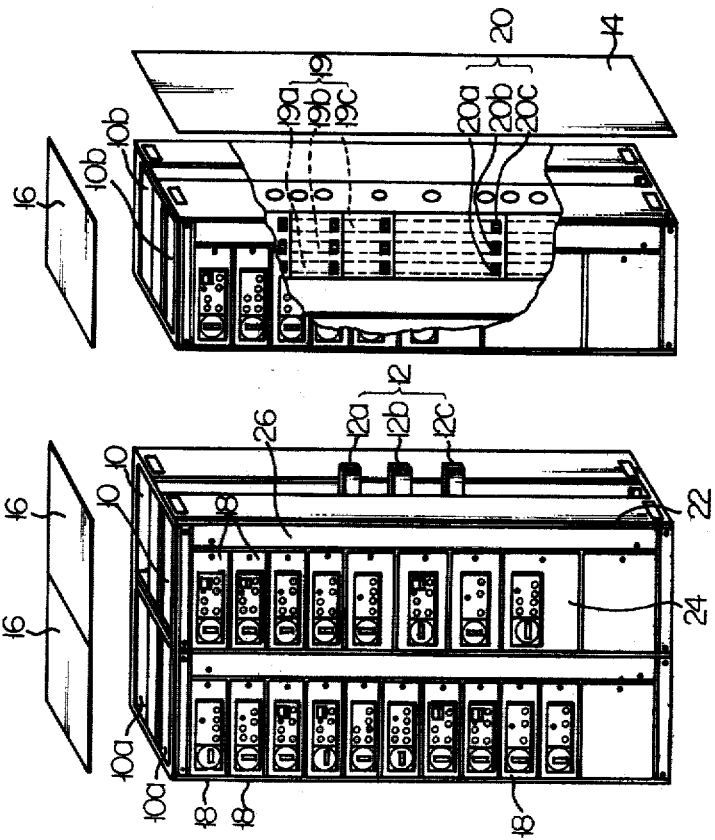
FIG. 1 is a partially exploded view of motor control centers in accordance with the present invention.

FIG. 1 shows groups of motor control centers each consisting of two motor control centers 10, 10a and 10b. Each pair of motor control centers, 10, 10, 10a, 10a and 10b, 10b is arranged back-to-back in a two-sided arrangement. The pair of motor control centers 10, 10 is coupled to the pair of motor control centers 10a, 10a on the side. Although the motor control centers 10b, 10b are also coupled to the motor control centers 10, 10 at the sides, they are shown separately to show the mutual relations of the motor control centers. On the adjacent back faces of the paired motor control centers are mounted substantially horizontally extending three-phase main buses 12a, 12b and 12c which buses are collectively denoted as 12 for simplicity. The main buses 12 protrude toward the adjacent motor control center at the right and are coupled to the main buses in this motor control center. Since motor control centers 10b, 10b at the extreme right have no motor control center on the right to which they may be coupled, they have no protruding main buses and are closed by a side plate 14. The members denoted by 16 and shown above the motor control centers 10a, 10 and 10b are top lids of the motor control centers. Although three two-sided type motor control centers are shown in FIG. 1, a smaller or larger number of motor control centers can be connected for use, depending on the number and the characteristics of the electrical loads to be controlled.

A plurality of units 18 are mounted on the motor control centers. Branch buses 19a, 19b and 19c (to be collectively denoted as 19) are connected to the main buses 12a, 12b and 12c, and three-phase power is supplied through three input parts 20a, 20b and 20c (to be denoted collectively as 20) formed on the branch buses 19 of each unit. Electrical appliances to be mounted in the unit, that is, the disconnector, case circuit breaker, electromagnetic contactor, various relays, transformer, the above-mentioned indicating lamp and so on are selected according to the kinds and rated values of the load and the intended kind of control. The dimension of the unit can also be varied according to the sizes of the selected electrical appliances. However, since the principle of the present invention relating to the motor control center and the units for constituting the motor control center is the same, the following description will be made about one typical motor control center and one unit to be used therefor.

Numeral 22 in FIG. 1 denotes a frame of a motor control center 10, and units 18 are substantially horizontally supported by the frame 22 and are arranged vertically inside the motor control center 10. Numeral 24 in the figure shows a unit door which is capable of opening and closing and whose left end is connected by a hinge. Numberal 26 denotes a wiring trough door for passing wires which connect the unit 18 with a load.

Figure 2:
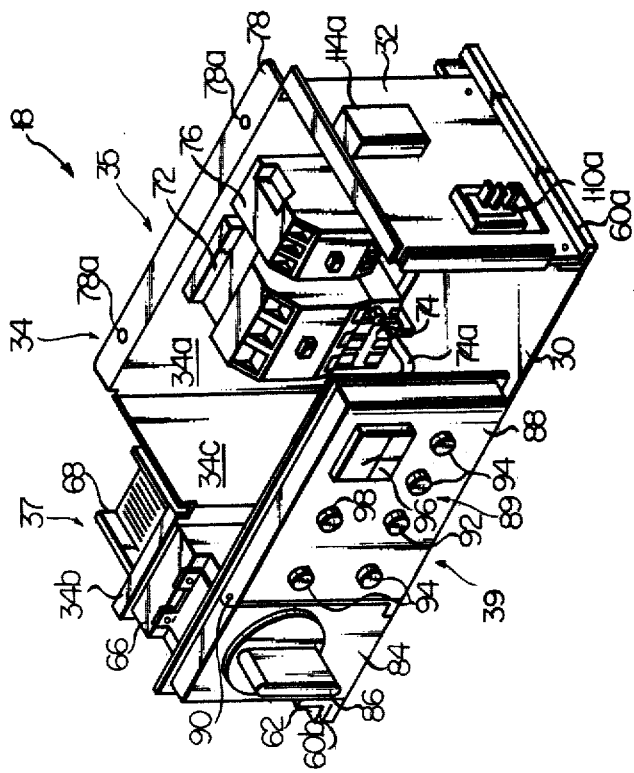
FIG. 2 is a perspective view of the unit to be used in the motor control center of FIG. 1.
Figure 3:
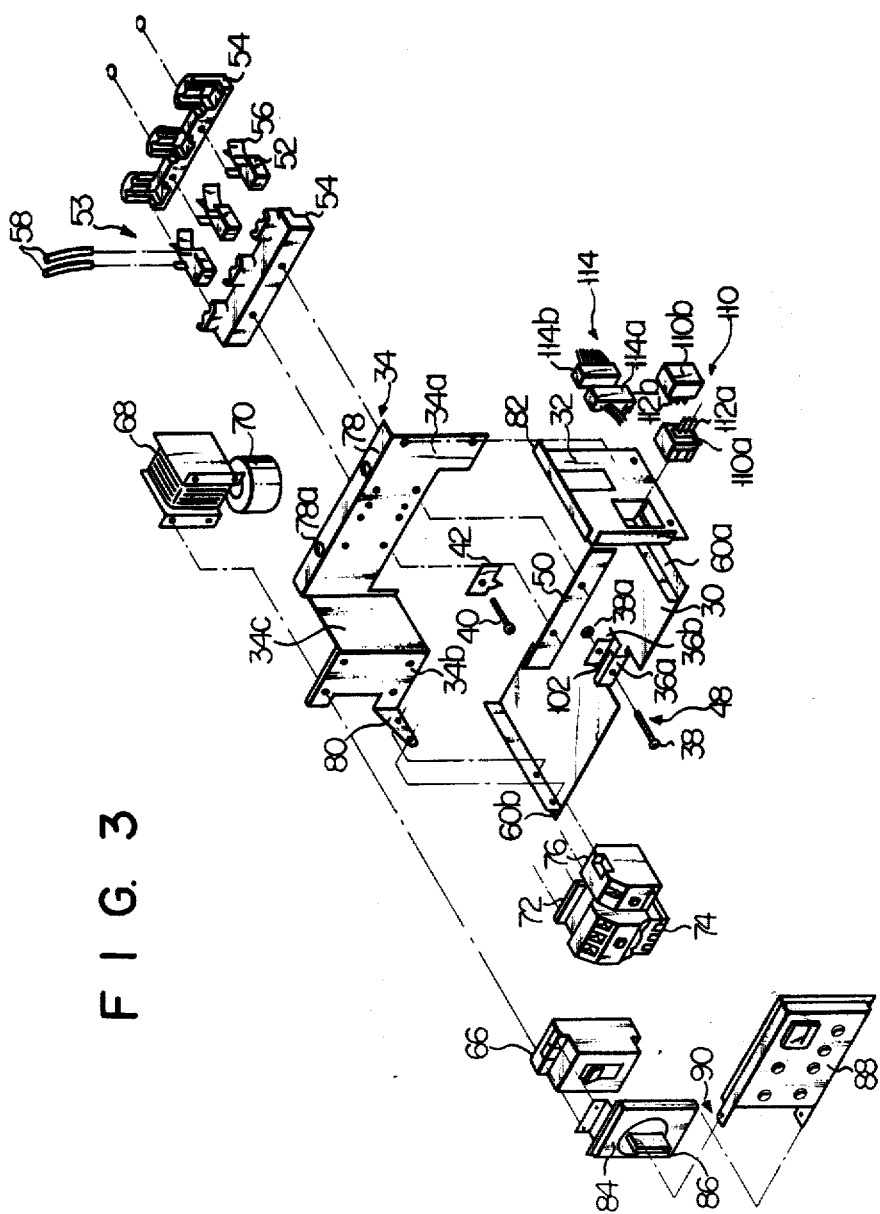
FIG. 3 is an exploded perspective view illustrating the construction of the unit shown in FIG. 2.

As shown in FIGS. 2 and 3, the unit 18 has a floor plate 30. The numeral 88 denotes a collective display panel on which are mounted the third group of electrical appliances 39. The side which the panel 88 faces will be called a front side, its opposite side will be called a rear side, and the left and the right sides of the above-mentioned unit will be called a left and a right sides. A longitudinally extending disconnecting part mounting plate 32 is vertically mounted at the right edge of the floor plate 30. On the floor plate 30 is mounted an appliance mounting plate 34 which has a first vertical wall 34a vertically extending from the rear edge of the floor plate 30, a third vertical wall 34c extending toward the front side from the left end of the first vertical wall 34a, and a second vertical wall 34b extending from the front end of the third vertical wall 34c toward the left side. A first mounting plate 36a and a second mounting plate 36b are formed at the central front part of the floor plate 30. A screw 38, a snap ring 38a, a spring 40 and a locking plate 42 are arranged with these mounting plates 36a and 36b. These members constitute a drawing mechanism 48 which, in cooperation with an engaging hole 46 formed in a shelf plate 44, locks the unit 18 in the engaging position or testing position and which releases the lock and permit to draw the unit 18 out of the motor control center 10. A mounting plate 50 (FIG. 3) is formed at the rear edge of the floor plate 30. A main input circuit disconnecting part 53 with a pair of electrically insulating clamping bodies 54 for securely holding contactors 52 is mounted on this plate 50. Three contact pieces 56 extending backwards from these contactors 52 through these clamping bodies 54 are connected to the input parts 20a, 20b and 20c (FIG. 1) when the unit is inserted in the frame 22 (FIG. 1). Conductors 58 for internal wiring are connected to each contact piece 56. For the sake of simplicity, only the conductors 58 for one contact piece 56 are shown in the figure. A projection 60a protrudes from the right end, and a projection 60b protrudes from the left end of the floor plate 30. These projections 60a and 60b engage with two guide members 64a and 64b mounted on the shelf plate 44 and the unit 18 is longitudinally guided by the guide members 64a and 64b as described hereinafter. A case circuit breaker 66 which requires relatively frequent maintenance and inspection is mounted on the front face of the second vertical wall 34b of the appliance mounting plate 34, and electrical appliances which requires relatively infrequent maintenance and inspection, such as an auxiliary transformer 68 and a current transformer 70, are mounted on its back. An electromagnetic contactor 72, a thermal relay 74, an auxiliary relay 76 which require relatively frequent maintenance and inspection, are mounted on the front face of the first vertical wall 34a. A horizontal part 78 is formed at the upper end of the first vertical wall 34a, and a pair of through holes 78a are formed in this horizontal part. These through holes 78a are used when the unit 18 must be suspended. Numerals 80 and 82 shown in FIG. 3 refer to walls extending respectively from the second vertical wall 34b and the disconnecting part mounting plate 32 and are used to mount the appliance mounting plate 34 to the floor 30 and to the disconnecting part mounting plate 32.

Figure 5:
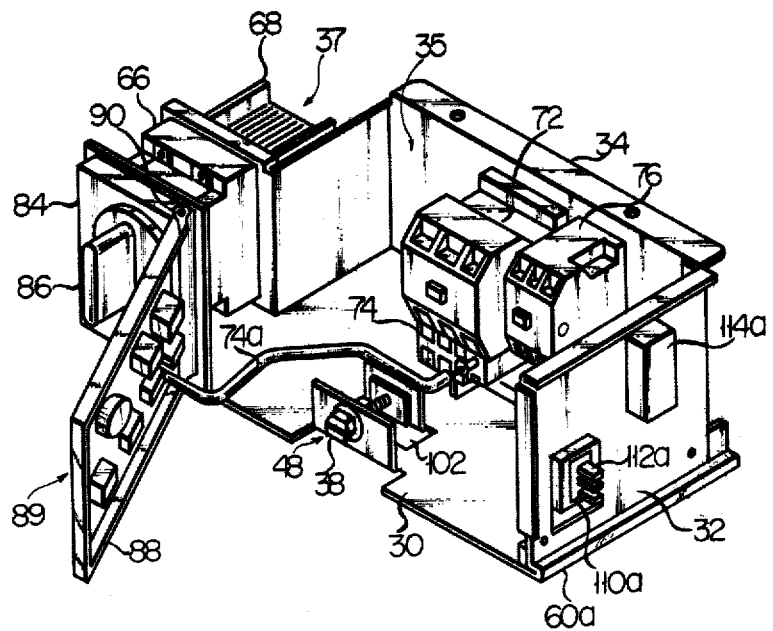
FIG. 5 is a perspective view illustrating a case wherein a collective display panel is used in the unit shown in FIG. 2.

A plate frame 84 is mounted at the front face of the case circuit breaker 66, and a manipulating handle 86 is mounted on the plate frame 84. The manipulating handle 86 is used to open and close the case circuit breaker 66 and serves to interlock the unit door 24 closed as shown in FIGS. 1 and 7 while the case circuit breaker 66 is closed. The left side of the collective display panel 88 is supported by a hinge mechanism 90 at the right side of the plate frame 84 so that it can be opened and closed. FIG. 5 illustrates a case wherein the collective display panel 88 is opened. A press button switch 92 for opening and closing the electromagnetic contactor 72, a press button 92, and indicating lamp 94, an ammeter 96, a release button 98 for resetting the thermal relay 74, that is, the above-mentioned indicating lamps 89 and so on are mounted on the collective display panel 88. Numeral 74a in FIGS. 2 and 5 denotes a release wire for connecting the release button 98 and the thermal relay 74.

FIG. 4 shows the construction of the frame 22 of the motor control center 10 to mount the unit 18. The shelf plates 44 are mounted on the frame 22 and are vertically spaced apart from each other according to the height of the unit 18. H-shaped engaging holes 46 are formed in the shelf plates 44, on which are mounted longitudinally extending guide members 64a and 64b. The unit door 24 is mounted on a hinge 100 to the front face of the frame 22 for each mounting section 99 in which the unit 18 is inserted. The branch buses 19 run vertically at the back part of the shelf plates 44. The input parts 20 for supplying power to the unit 18 are formed integrally with each of these branch buses 19.

When the unit 18 is inserted in the mounting section 99, the projections 60a and 60b (FIG. 2) engage with the guide members 64a and 64b. The unit 18 is guided by the guide members 64a and 64b to be displaced in a predetermined direction. The longitudinal position of the unit 18 is determined by the drawing mechanism which operates in cooperation with the engaging hole 46, and the main input circuit disconnecting part 53 is accurately connected to the input parts 20. When the unit door 24 is closed, the plate frame 84 and the collective display panel 88 can be slightly projected through a window 24a formed on the unit door 24. The aforementioned interlock mechanism interposed between the manipulating handle 86 mounted on the plate frame 84 and the unit door 24 which operates here is known, so it will not be shown or described here.

Figure 6A:
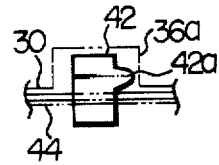
FIGS. 6A and 6B are, respectively, a front view and a side view of a part of a drawing mechanism when the unit is in an engaging position.
Figure 6B:
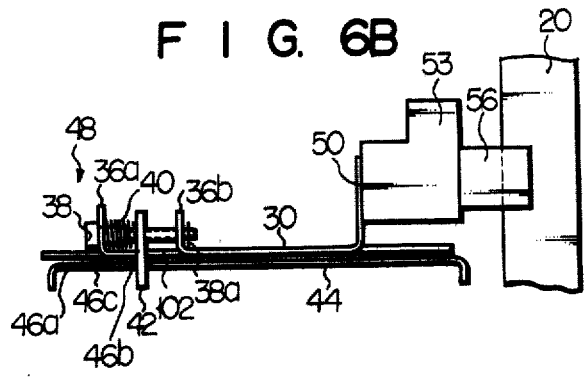
Figure 7A:
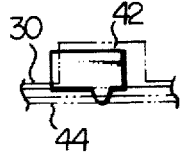
FIGS. 7A and 7B are, respectively, a front view and a side view of a part of a drawing mechanism when the unit is in a testing position.
Figure 7B:
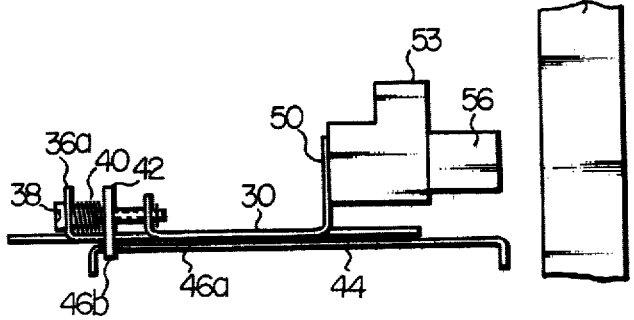
Figure 8A:
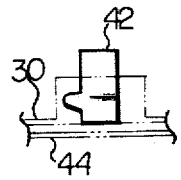
FIGS. 8A and 8B are a front view and a side view, respectively, of a part of a drawing mechanism when the unit can be withdrawn from the mounting section.
Figure 8B:
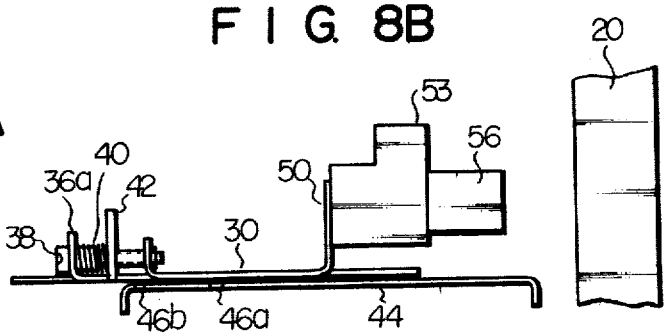

The drawing mechanism 48 will now be described. The drawing mechanism 48, shown in exploded perspective in FIG. 3, is shown assembled in FIGS. 5, 6A, 6B, 7A, 7B, 8A and 8B. The screw 38 extends through and out of both the first mounting plate 36a and the second mounting plate 36b, and is supported on the mounting plates 36a and 36 b by the head part of the screw 38 and the snap ring 38a fixed on the top end of the screw. The locking plate 42 is threadably engaged at the intermediate position of the mounting plates 36a and 36b. A spring 40 is inserted between the first mounting plate 36a and the locking plate 42. The threaded portion of the rectangular locking plate 42 and the screw 38 receive frictional force by means of the spring 40 for unitary pivotal movement. The locking plate 42 has a triangular protrusion 42a at a position offset from the midpoint of the longer side of the rectangle extending parallel to the shorter side (FIG. 6A). As the screw 38 rotates, the locking plate 42 rotates, under the above-mentioned force, about a point defined by the intersection of a line connecting the midpoints of the shorter sides of the rectangle and another line passing through the vertex of the protrusion 42a perpendicular to the first line. The engaging hole 46, as shown in FIG. 4, comprises a rear transverse groove 46b extending transversely, a front transverse groove 46a extending transversely, and a longitudinal groove 46c extending longitudinally and connecting these grooves 46a and 46b. The transverse grooves 46a and 46b extend farther on the right side than on the left side of the longitudinal groove 46c. Thus, when the locking plate 42 is pivoted to the right, the plate 42 is able to engage with the transverse grooves 46a and 46b as shown in FIG. 6A. However when the locking plate 42 is rotated to the left then the engagement with the grooves 46a and 46b is prohibited as shown in FIG. 7A. When the unit 18 is displaced as it is guided by the guide members 64a and 64b, the floor plate 30 also moves along the shelf plate 44. In FIGS. 6A and 6B, the unit 18 is inserted into the corresponding mounting section, and the locking plate 42 is above the rear transverse groove 46b. When the screw 38 is rotated clockwise, the locking plate 42 is rotated in the same direction, and extends downward through a hole 102 (FIG. 3) formed through the floor plate 30 and through the rear transverse groove 46b; the unit 18 is locked in the engaging position corresponding to the rear transverse groove 46b. Under this condition, there is a little play due to space between the locking plate 42 and the transverse groove 46b. Then, the screw 38 is rotated further in the clockwise direction. Since the locking plate 42 is inhibited from rotating clockwise by engagement with the rear transverse groove 46b, a force larger than the frictional force caused by the spring 40 is exerted on the threaded part of the screw 38, and the screw 38 alone is rotated. The locking plate 42 thus moves to the left side of the rear transverse groove 46b. Therefore, the unit 18 is secured without play in the engaging position by the locking plate 42 being pressed against the inner side of the rear transverse groove 46b.

In this position, the unit 18 is inserted in the deepest position in which the contact piece 56 of the main input circuit disconnecting part 53 is securely connected to the branch buses 19 as shown in FIG. 6B. FIG. 6A shows the positional relation among the floor plate 30, the shelf plate 44, and the locking plate 42. When the screw 38 is rotated counterclockwise, the pressed condition is released and the locking plate 42 rotates counterclockwise with the screw 38 under the frictional force exerted by the spring 40. Then the locking plate 42 engages with the floor plate 30, and the counterclockwise rotation is stopped as shown in FIG. 7A. Under this condition, the front end of the protrusion 42a of the locking plate 42 protrudes in the longitudinal groove 46c. Thus, when the unit 18 is pulled toward the front side, the unit 18, that is, the front end of the protrusion 42a, is displaced along the longitudinal groove 46c to the front side. This displacement is terminated when the front end of the protrusion 42a contacts the wall of the front transverse groove 46a. The contact piece 56 is separated from the input parts 20 under this condition. Under this condition, testing and/or inspection of electrical appliances is possible since the unit 18 is nonconductive, and the control circuit can be kept connected by a control circuit connector 114 (FIG. 3) to be described hereinafter. Thus, the position of the unit 18 here will be referred to as the testing position. The relation between the protrusion 42a and the engaging hole 46 under this condition is shown in FIG. 7A. When it is desired to lock the unit 18 at this testing position, the screw 38 is rotated clockwise. For pulling out the unit 18, the locking plate 42 is rotated through 90° from the condition shown in FIG. 7A by means of the screw 38. By this manipulation, the locking plate 42 is displaced to a position above the engaging hole 46 of the shelf plate 44, and the unit 18 may be drawn from the frame 22 to the front.

Figure 9:
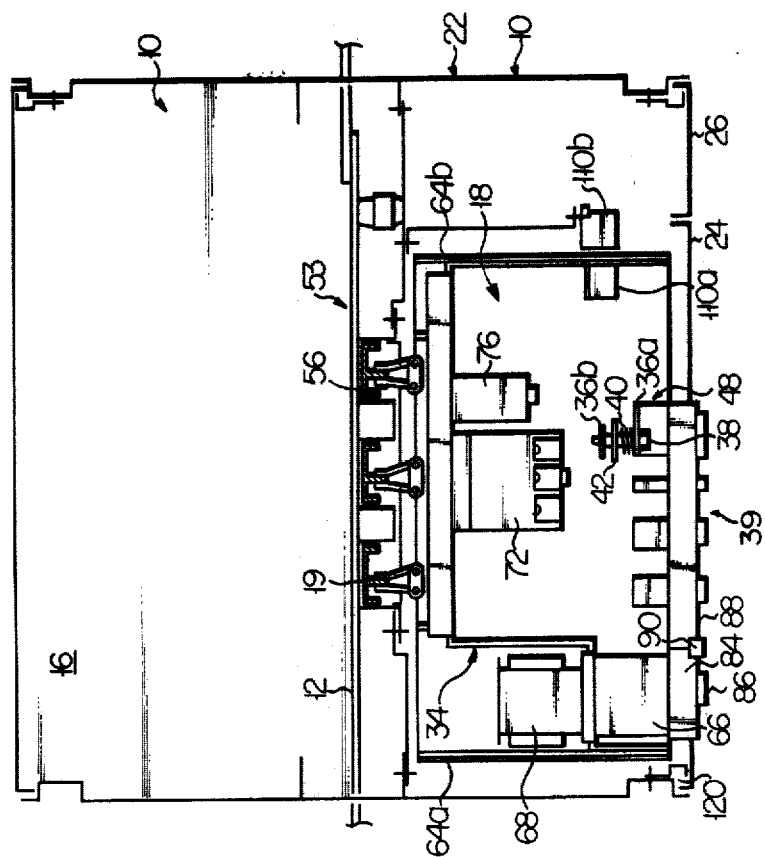
FIG. 9 is a plan view illustrating the inside construction of a unit shown in FIG. 1.

Numeral 110 in FIG. 3 denotes a main input circuit disconnecting part, and the control circuit connector 114 couples the unit 18 to an external control circuit (not shown) for supplying operating signals to the electrical appliances inside the unit 18. The disconnecting part 110 comprises a transmitting part 110a and a receiving part 110b. A plurality of contact pieces 112a protrude backward from the transmitting part 110a, and a plurality of receiving contact pieces 112b protrude forward from the receiving part 110b. The transmitting part 110a, as shown in FIGS. 2, 5 and 9, is mounted on the disconnecting part mounting plate 32 and is moved longitudinally with the unit 18. The receiving part 110b, as shown in FIG. 9, is mounted on the frame 22, and the longitudinally movable contact pieces 112a contact with the receiving contact pieces 112b (FIG. 3) secured to the receiving part 110b in the position at which the unit 18 is coupled to the input parts 20 of the branch buses 19. The control circuit connector 114 comprises a transmitting part 114a and a receiving part 114b. The transmitting part 114a, as shown in FIGS. 2 and 5, is mounted on the disconnecting part mounting plate 32. The receiving part 114b is mounted to the frame 22 with wires of sufficient length to allow movement in a suitable range. When the unit 18 is in a position between the engaging position and the testing position, the receiving part 114b is coupled to the transmitting part 114a. When the unit 18 is withdrawn from the frame, the receiving part 114b is manually separated from the transmitting part 114a.

FIG. 5 shows the condition of the unit 18 in which the collective display panel 88 is pivoted toward the front side for inspection and maintenance of the interior. It may be seen from this figure that maintenance and inspection of a first group of electrical appliances 35, which requires frequent inspection and maintenance, is easily excuted from the front side without being disturbed by a second group of electrical appliances 37, which requires relatively infrequent inspection and maintenance, even when the unit 18 is within the frame. The first group 35 comprises a case circiuit breaker, an electromagnetic contactor, a thermal relay and an auxiliary relay, while the second group 37 comprises an auxiliary transformer and current transformer.

FIG. 9 is an internal plan view wherein one of the upper lids 16 of the back-to-back motor control centers 10, 10 is removed. It is seen from this figure (FIG. 9) that the unit door 24 can rotate clockwise about a hinge mechanism 120 formed at the left front end of the frame 22, and the plate frame 84 and the collective display panel 88 slightly protrude from the window 24a (FIG. 4) formed in the unit door 24 when the unit door 24 is closed, as shown in the FIG. 9. The positional relations of the main buses 12, the branch buses 19, the main input circuit disconnecting part 53, and the contact pieces 56 are also shown in this figure.

Figure 10:
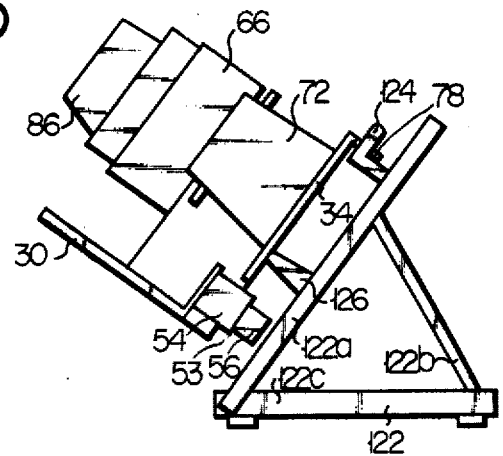
FIG. 10 is a side view illustrating the manner in which the unit shown in FIG. 2 is assembled outside the motor control center using an assembling stand.

The necessary electrical appliances, disconnecting parts, connectors, indicating lamps and so on are assembled in the unit 18 of the motor control center 10, and this unit is detachable from the frame 22 so that most of the unit 18 can be assembled outside. FIG. 10 shows an assembling stand 122 to be used for the assembly and internal wiring of the unit. The assembling stand 122 has a rectangular plate 122a extending obliquely with respect to the horizontal plane of the figure. The stand 122 also has members 122b and 122c for supporting the rectangular plate 122a at this position. Two L-shaped engaging bars 124 stand upright from the rectangular plate 122a. In FIG. 10, only one engaging bar 124 is shown since they are aligned in superposition in this figure. These two engaging bars 124 are inserted in the through holes 78a formed in the horizontal part 78 shown in FIG. 2. Therefore, the appliance mounting plate 34, the disconnecting part mounting plate 32, and the floor plate 30 are assembled in a unitary form and are supported by the two engaging bars 124. Numeral 126 denotes a pair of projections which protrudes outwards substantially perpendicular to the rectangular plate 122a and which supports the appliance mounting plate 34 in a parallel relationship to the rectangular plate 122a. On the disconnecting part mounting plate 32 and the appliance mounting plate 34 suspended by the engaging bars 124 are mounted various electrical appliances already discussed and shown in the drawings. The plate frame 84 is secured to the case circuit breaker 66, and the collective display panel 88 is pivotably secured to the plate frame 84. The manipulating handle 86 is mounted on the plate frame 84, the indicating lamps and so on shown in FIG. 2, are mounted on the collective display panel 88 and the internal wiring is completed to the furthest possible extent. The unit 18 thus assembled is removed from the assembling stand 122 and is inserted in the mounting section 99 of the frame 22. The external assembly of the unit 18 is extremely effective in reducing the number of assembly procedures of the unit 18.

Figure 11:
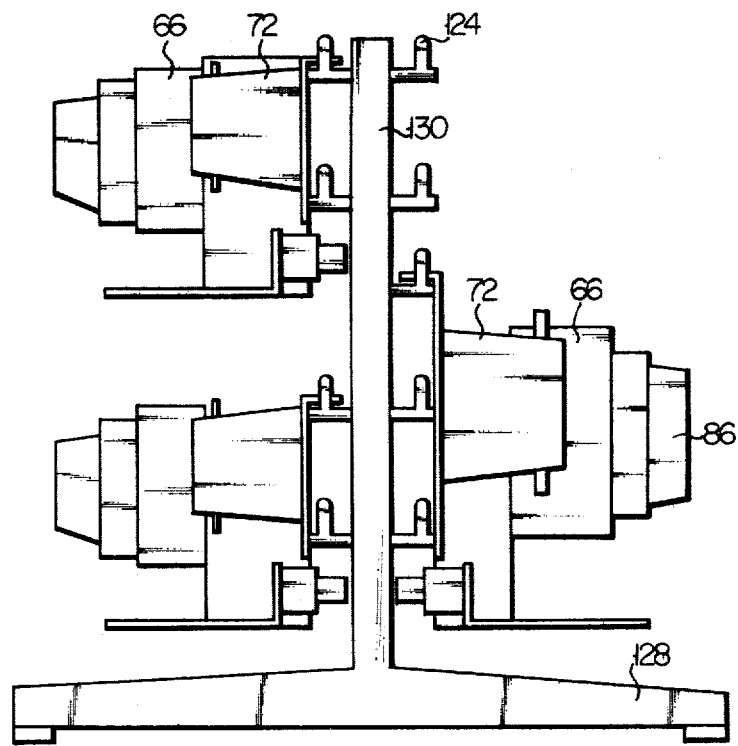
FIG. 11 is a side view illustrating the manner in which a plurality of assembled units are suspended on a movable stand.

FIG. 11 shows a transfer rack 128 for suspending and transferring the unit 18 assembled in the manner shown in FIG. 10 or by other methods. Numeral 130 denotes an upright wall formed on the transfer rack 128, and various L-shaped engaging bars 124 protrude therefrom at various distances from the rectangular plate. The unit 18 of various sizes can be suspended by these L-shaped engaging bars 124 for transfer, facilitating the efficiency of transferring units during the assembling and wiring procedures.

The manner in which the unit 18 thus assembled is mounted on the mounting section 99 formed in the frame 22 shown in FIG. 4 will now be described. The unit door 24 of the mounting section 99 is first opened. The projections 60a and 60b formed on the left and right sides of the unit 18 are coupled to the guide members 64a and 64b mounted on the shelf plates 44. The unit 18 is then inserted into the mounting section 99. When the unit 18 is inserted sufficiently, three contact pieces 56 of the unit 18 are respectively coupled to the branch buses 19, and the main input circuit disconnecting part 110 is securely coupled. When the screw 38 is rotated to engage the locking plate 42 with the rear transverse groove 46b, secure contact is established between both the disconnecting parts 110 and the connector 114. Then when the unit door 24 is rotated about the hinge mechanism 120 formed at its left end, the mounting section 99 is closed by the unit door 24 from the front side. The plate frame 84, the manipulating handle 86, the collective display panel 88, and the indicating lamps and so on mounted on the panel 88 are slightly protruded through the window 24a of the unit door 24. When the manipulating handle 86 is manipulated, the unit door 24 is interlocked, and the case circuit breaker 66 is turned on. The power supplied from the branch buses 19 through the main input circuit disconnecting part 53 is supplied through the case circuit breaker 66, the electromagnetic contactor 72, the thermal relay 74, and the main output circuit disconnecting part 110 to an external load. Although a zero-phase current transformer is connected between the thermal relay 74 and the disconnecting part 110 in some cases, this is not shown in the figure in order to illustrate the essential functions of the electric circuit.

The auxiliary transformer in FIG. 2, 68 is a transformer connected between two phases of the three-phase circuit between the case circuit breaker 66 and the electromagnetic contactor 72, and it supplies source voltage to various control circuits disposed in the unit 18 and the display circuit. The current transformer 70 shown in FIG. 3 is connected to one predetermined conductor for measuring one of the phase currents flowing in the unit 18, and its output current is supplied to a load through the ammeter 96 on the collective display panel 88 or an ammeter of an external circuit (not shown). The ammeter 96, the press button switch 92, the release button 98, and four indicating lamps 94 connected at suitable places are shown on the front face of the panel 88. The kinds of the electrical appliance mounted on the unit 18 shown in the figure only represent examples and can therefore be varied according to the type of load circuit related to the unit, control type and the monitoring type. It is seen from FIG. 1 that the units 18 may have different heights, and different kinds and numbers of indicating lamps and so on may be used therefor.

What we claim is:

1. A motor control center having a frame which has a plurality of mounting sections open in one direction, a three-phase main bus, and a three-phase branch bus; and a plurality of units mounted in each mounting section, supplied with power from said branch bus, and supplying power to a predetermined load;

each of said units comprising a floor plate; a first group of electrical appliances which requires relatively frequent inspection and maintenance; a second group of electrical appliances which requires relatively infrequent inspection and maintenance; and an appliance mounting plate which stands upright from said floor plate and which has a first and a second vertical wall spaced apart in said one direction and extending parallel to each other in stepped form;

said first group of electrical appliances being mounted on the sides of said first and second vertical walls which face said one direction; and said second group of electrical appliances being mounted on the side of the second vertical wall which faces opposite to said one direction.

2. A motor control center as claimed in claim 1 wherein said appliance mounting plate of said motor control center has a third vertical wall which substantially perpendicularly connects said first and second vertical walls.

3. A motor control center as claimed in claim 1 wherein said first group of electrical appliances includes a case circuit breaker, an electromagnetic contactor and a thermal relay.

4. A motor control center as claimed in claim 3 wherein said first group of electrical appliances further includes an auxiliary relay.

5. A motor control center as claimed in claim 1 wherein said second group of electrical appliances includes an auxiliary transformer.

6. A motor control center as claimed in claim 5 wherein said second group of electrical appliances further includes a current transformer.

7. A motor control center as claimed in claim 3 wherein said case circuit breaker is mounted on the front side of said second vertical wall facing said one direction, a plate frame with a manipulating handle for opening said breaker is mounted on the side of said case circuit breaker facing said one direction, and a collective display panel is mounted at the side of said plate frame so as to be pivotable toward said front side.

8. A motor control center as claimed in claim 7 wherein said plate frame has a hinge mechanism for pivoting said collective display panel about a vertical axis.

9. A motor control center as claimed in claim 1 wherein said frame has guide members extending in said one direction, that is, spaced apart in a substantially transverse direction perpendicular thereto.

10. A motor control center as claimed in claim 9 wherein said frame has a shelf plate for partitioning said mounting sections and said guide members mounted thereon for guiding a said unit in a predetermined direction.

11. A motor control center as claimed in claim 10 wherein said unit includes a drawing mechanism comprising a locking plate and means for rotating said locking plate both mounted on said floor plate, said locking plate extending outwards through an opening formed in said floor plate when rotated.

12. A motor control center as claimed in claim 11 wherein said shelf plate has an engaging hole including a front transverse groove and a rear transverse groove, said front transverse groove defining a testing position of the unit when said locking plate engages said front transverse groove, and said rear transverse groove defining a engaging position of the unit when said locking plate engages said rear transverse groove.

13. A motor control center as claimed in claim 12 wherein said unit further includes a main input circuit disconnecting part mounted on said floor plate, and said disconnecting part is not coupled to said branch bus when said unit is in testing position and is securely coupled to said branch bus when said unit is in said engaging position.

* * * * *